United States Patent Office 3,188,317
Patented June 8, 1965

3,188,317
OXAZOLIDINONE DERIVATIVES
Richard A. Hickner, Midland, Mich., assignor to The Dow Chemical Company, Midland, Mich., a corporation of Delaware
No Drawing. Filed Dec. 22, 1961, Ser. No. 161,436
9 Claims. (Cl. 260—307)

This invention relates to certain derivatives of 2-oxazolidinone and 2-pyrrolidinone as new chemical compounds, and a process for preparing such compounds.

Specifically, the compounds related to are those having the formula:

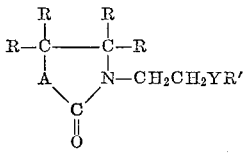

wherein each R represents either hydrogen or a lower alkyl radical, A is either oxygen or the methylene group, R' represents an alkyl group containing from 1 to 18 carbon atoms, the benzothiazole group, or a phenyl group containing from 0 to 4 halogen substituents, said halogens having an atomic number from 17 to 35, and Y is a chalcogen having an atomic number from 8 to 16.

The term "lower alkyl" is used herein to mean an alkyl group containing from 1 to about 4 carbon atoms.

The compounds of the present invention are conveniently prepared by reacting an appropriate 3-(2-chloroethyl)- or 3-(2-bromoethyl)-2-oxazolidinone or a 1-(2-chloroethyl)-2-pyrrolidinone or 1-(2-bromoethyl)-2-pyrrolidinone with an alkali metal-containing compound having the formula:

$$R'YZ$$

wherein R' and Y each have the same significance as previously described and Z represents an alkali metal having an atomic number from 3 to 55. The reactants are mixed, preferably in a suitable solvent such as dioxane, dimethylformamide or ethanol, and the reaction is conducted preferably at about 75–150° C. or the reflux temperature of the solvent until substantially maximum conversion of the reactants is effected. Then the solvent is removed, such as by distillation, and the desired product separated from the reaction mixture, such as by distillation.

The sodium-containing compound used as a reactant may be employed as such or it can be prepared in situ by reacting a sodium alkoxide with the appropriate alcohol, phenol or mercaptan, depending on the final product desired.

Although the combining of the reactants in virtually any molar proportions will result in the preparation of some of the desired product, equimolar proportions of reactants are preferred.

The practice of the present invention is illustrated by a series of experiments in each of which approximately equimolar proportions of a 3-(2-chloroethyl)-2-oxazolidinone or a 1-(2-chloroethyl)-2-pyrrolidinone were reacted with a sodium-containing compound belonging to the genus previously described. The reactions were conducted in a solvent medium, generally ethanol, and at or near the reflux temperature of the reaction mixture for several hours. The by-product sodium chloride was removed by filtration and the solvent removed by distillation. There are shown in Table I for each experiment the compound prepared, its boiling point or melting point, refractive index, and yield based on the starting materials.

Table I

| Exp. No. | Compound | B.P. or M.P., ° C. | $N_D^{25}$ | Yield, Percent |
|---|---|---|---|---|
| 1 | 3-(2-phenoxyethyl)-5-methyl-2-oxazolidinone. | 139–143 at 0.1 mm. | 1.5255 | 50 |
| 2 | 3-(2-(dodecylthio)ethyl)-5-methyl-2-oxazolidinone. | 180–200 at 0.1 mm. | | 84 |
| 3 | 3-(2-(2,4-dichlorophenoxy)ethyl)-5-methyl-2-oxazolidinone. | >200 at 0.1 mm. | | 60 |
| 4 | 3-(2-(2-benzothiazolylthio)ethyl)-5-methyl-2-oxazolidinone. | >200 at 0.1 mm. | | 89 |
| 5 | 3-(2-(pentylthio)ethyl)-2-oxazolidinone. | 134–136 at 0.1 mm. | 1.4877 | 90 |
| 6 | 3-(2-(pentylthio)ethyl)-5-methyl-2-oxazolidinone. | 141–150 at 0.3 mm. | 1.4954 | 76 |
| 7 | 3-(2-(tetradecylthio)ethyl)-5-methyl-2-oxazolidinone. | >200 at 0.1 mm. | | 83 |
| 8 | 3-(2-(3,4-dichlorophenoxy)ethyl)-5-methyl-2-oxazolidinone. | 188–208 at 0.3 mm. | 1.5499 | 31 |
| 9 | 3-(2-(2,4,5-trichlorophenoxy)ethyl)-5-methyl-2-oxazolidinone. | 76–79 (M.P.) | | 13 |
| 10 | 3-(2-(p-chlorophenylthio)ethyl)-5-methyl-2-oxazolidinone. | | 1.5857 | 96 |
| 11 | 1-(2-(dodecylthio)ethyl)-2-pyrrolidinone. | >130 at 0.1 mm. | 1.4843 | 94 |

In addition to those specifically disclosed, other 2-oxazolidinone and 2-pyrrolidinone derivatives may be prepared from appropriate starting materials, such as for example, 3 - (2(hexyloxy)ethyl)-, 3-(2-(hexadecyloxy)ethyl) - 5 - methyl, 3-(2-octyloxy)ethyl-4,4-dimethyl-, 3-(2-(heptadecyloxy)ethyl - 4 - methyl-5-n-propyl-, 3-(2-phenoxyethyl)-4-methyl-5-ethyl-, 3 - (2-(hexylthio)ethyl)-4,5-diethyl-, 3-(2(pentadecyloxy)ethyl) - 4 - ethyl-5-n-propyl-2-oxazolidinones, and 1-(2-heptyloxy)ethyl - 5,5-dimethyl-, 1-(2-(hexadecyloxy)ethyl-4-ethyl - 5 - methyl-, 1-(2-(octylthio)ethyl)-4-n-propyl - 5 - t - butyl-, 1-(2-phenoxyethyl)-4,5-diethyl-, 1-(2-(3,4 - dichlorophenoxy)ethyl)-4-methyl-, and 1-(2-(p-chlorophenylthio)ethyl)-2-pyrrolidinones.

The compounds of the present invention have proven utility as pre-emergent herbicides, as seedicidies, as agents for killing aquatic weeds, as anthelmintics, as nematocides, as fungicides, as algaecides, as plant insecticides, as plasticizers for polyvinyl chloride, and as emulsifiers.

The utilities described above are shown as follows:

The compound of Experiment 1, when employed as an aqueous dispersion at a concentration of 50 pounds per 1266 gallons of water and evaluated as a pre-emergent herbicide by applying 150 ml. of this dispersion to each of a series of specimens, each of which had been placed in a 5" pot and covered with 3" of soil, effected kills of 100 percent of a series of specimens of each of the species German millet, sorghum milo, and Japanese millet, and a 75 percent kill of a number of specimens of wild oats.

The compound prepared in Experiment 1, when evaluated in vitro as a seedicide and used as an aqueous dispersion at a concentration of 100 parts per million, showed a 60 percent control of Japanese millet.

Utility of the compounds prepared in Experiments 2 and 9 as agents for killing aquatic weeds was demonstrated in a series of experiments wherein numerous specimens of the particular species of weed were immersed in an aqueous dispersion containing 10 parts per million of the test compound, allowed to remain for several days, then removed and the percent control determined. Both of the test compounds effected a 100 percent control of moneywort, and the compound of Experiment 2 effected a 100 percent kill of each of the species elodea, cabomba, and coontail.

The compounds prepared in Experiments 3, 4, 6 and 10 were each evaluated as anthelmintics by first infecting test mice with the tapeworm or pinworm and then feeding to the test animals for several days a diet containing a minor proportion of the test compound. The animals were then sacrificed and the tests evaluated according to the necropsy findings. The compounds prepared in Experiments 3 and 10, when used in the concentration of 0.25 and 0.06 weight percent, respectively, of the diet, effected a 100 percent control of the mouse tapeworm. The compounds prepared in Experiments 4 and 6, when used in concentrations of 0.25 and 0.12 weight percent, respectively, of the diet, showed an 87 percent kill and a 94 percent kill, respectively, of pig ascarids.

Each of the compounds prepared in Experiments 5, 6, 9 and 10 when used separately at a concentration of 10 p.p.m. in an aqueous dispersion, showed controls of 100, 80, 75 and 100 percent, respectively, of the rootknot nematode. The compound prepared in Experiment 3, when employed at a concentration of 25 p.p.m., effected a 90 percent control of the same nematode.

The compound of Experiment 1, when evaluated as a fungicide and used at a concentration of 10 p.p.m. in an aqueous dispersion effected a 100 percent control of brown rot fungus.

The compound prepared in Experiment 4, when evaluated as an algaecide and applied as an aqueous dispersion at a concentration of 1 p.p.m., showed a 98 percent control of blue-green algae.

The compound prepared in Experiment 8 was evaluated as a plant insecticide by dipping a number of a species of insect into an aqueous dispersion of the test compound, withdrawing the insects and placing them on a host plant for several days, and then inspecting the insects to determine the percent mortality. The test compound, at a concentration of 0.05 weight percent, effected an 80 percent mortality of a series of Mexican bean beetles.

The compounds prepared in Experiments 7 and 11 were evaluated as plasticizers for polyvinyl chloride by incorporating them into separate formulations, each of which contained 100 parts of polyvinyl chloride, 50 parts of the test compound, 3 parts of Harshaw 12–V–6 (a barium-cadmium stabilizer), and 5 parts of an epoxidized soybean oil (Paraplex G–62). The plasticized resin was then milled at 360° F. and the tensile strength and elongation were determined on each of the milled samples. The formulations prepared from the compounds of Experiments 7 and 11 were found to have tensile strengths of 2780 p.s.i. and 2370 p.s.i., respectively, and showed elongations of 525 percent and 760 percent, respectively.

The compound prepared in Experiment 11 was evaluated as an emulsifier by mixing 5 grams of dibutyl maleate with 15 grams of water, and 1 gram of the test compound, and shaking the mixture vigorously several times. A stable homogeneous system resulted.

I claim:
1. A compound having the formula:

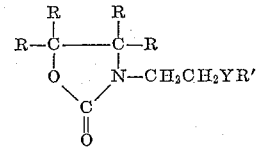

wherein each R is independently selected from the class consisting of hydrogen and lower alkyl radicals, and R' is a phenyl group having from 0 to 4 halogen substituents, said halogens having an atomic number from 17 to 35, and Y is a chalcogen having an atomic number from 8 to 16.

2. A compound having the formula:

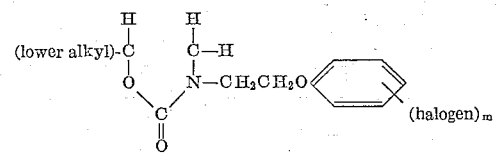

wherein $m$ is an integer from 1 to 4.

3. A compound as defined in claim 2 wherein the lower alkyl group is —$CH_3$.

4. 3 - (2-phenyoxyethyl)-5-(lower alkyl)-2-oxazolidinone.

5. 3-(2-phenoxyethyl)-5-methyl-2-oxazolidinone.

6. 3-(2-(2,4-dichlorophenoxy)ethyl) - 5 - methyl - 2-oxazolidinone.

7. 3 - (2 - (3,4 - dichlorophenoxy)-ethyl)-methyl-2-oxazolidinone.

8. 3 - (2 - (2,4,5-trichlorophenoxy)ethyl)-5-methyl-2-oxazolidinone.

9. 3 - (2 - (p - chlorophenylthio)ethyl) - 5 - methyl-2-oxazolidinone.

References Cited by the Examiner

Chem. Abstracts, Index to volume 53, page 2383S (1959).

Shostakovskii et al., Izvest. Akad, Nauk, SSSR, Otdel. Khim Nauk, 1961, pages 1111–6.

Wagner et al., Synthetic Organic Chemistry (New York, 1953), pages 226–8 and 787–8.

NCHOLAS S. RIZZO, *Primary Examiner.*

D. T. McCUTCHEN, WALTER A. MODANCE,
*Examiners.*